United States Patent
Hisatake et al.

(10) Patent No.: US 7,304,756 B2
(45) Date of Patent: Dec. 4, 2007

(54) IMAGE INFORMATION PROCESSING APPARATUS, AND COMPUTER-READABLE RECORDING MEDIUM

(75) Inventors: Masayuki Hisatake, Kanagawa (JP); Shinichi Saito, Kanagawa (JP); Koichi Miyazaki, Kanagawa (JP); Kunikazu Ueno, Kanagawa (JP); Hideki Baba, Kanagawa (JP); Yumi Sekiguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 944 days.

(21) Appl. No.: 09/915,257

(22) Filed: Jul. 27, 2001

(65) Prior Publication Data

US 2002/0063888 A1 May 30, 2002

(30) Foreign Application Priority Data

Nov. 28, 2000 (JP) ............................ P 2000-361103

(51) Int. Cl.
*G06F 15/00* (2006.01)
(52) U.S. Cl. ................ 358/1.15; 358/539; 358/426.01; 707/203
(58) Field of Classification Search ................ 358/1.15, 358/539, 426.01; 707/203
See application file for complete search history.

(56) References Cited

U.S. PATENT DOCUMENTS

| | | | | |
|---|---|---|---|---|
| 5,522,041 A | * | 5/1996 | Murakami et al. | 709/203 |
| 5,619,571 A | * | 4/1997 | Sandstrom et al. | 380/200 |
| 5,636,631 A | * | 6/1997 | Waitz et al. | 600/437 |
| 5,926,824 A | * | 7/1999 | Hashimoto | 715/520 |
| 6,057,938 A | * | 5/2000 | Abe et al. | 358/400 |
| 6,128,101 A | * | 10/2000 | Saito | 358/402 |
| 6,351,553 B1 | * | 2/2002 | Hayosh | 382/139 |
| 6,782,402 B1 | * | 8/2004 | Hidaka et al. | 707/203 |
| 2001/0015823 A1 | * | 8/2001 | Sato | 358/1.15 |

FOREIGN PATENT DOCUMENTS

JP    11-127297    5/1999

OTHER PUBLICATIONS

Computer translation of Japanese Patent Document No. 11-127297 to Tanimoto dated May 11, 1999.*

* cited by examiner

*Primary Examiner*—Twyler Lamb
*Assistant Examiner*—Mark R. Milia
(74) *Attorney, Agent, or Firm*—Morgan, Lewis & Bockius LLP (57) ABSTRACT

A sender device 1 stores, in header information about image information, information indicating that attribute information and image data rearranged in sequence, and produces image information by means of storing attribute information and image data in a predetermined sequence. The thus-produced image information is sent to a receiver device 2 by way of a network line 3. When receipt of image information is initiated, the receiver device 2 refers to the header information, thereby determining presence/absence, in the header information, of information indicating that attribute information and image data are stored in a predetermined sequence. When it has been determined that attribute information and image data are arranged in a predetermined sequence, image data included in the received image information are immediately decompressed, and the thus-decompressed image data are output in the form of a record or display.

5 Claims, 8 Drawing Sheets

IMAGE INFORMATION PROCESSING APPARATUS, AND COMPUTER-READABLE RECORDING MEDIUM

BACKGROUND OF THE INVENTION

1. Field of the Invention

The present invention relates to an image information processing apparatus for producing image information in an image file format which enables storage of image data and attribute information thereof into an arbitrary position, as well as to an image information processing apparatus for enabling entry of image information in an image file format which enables storage of image data and attribute information thereof into an arbitrary position.

2. Related Art

In association with growth of the Internet and an increase in the speed of network lines, there have recently been put into use an apparatus which distributes image data to a receiving party by way of the Internet, such as an Internet facsimile, and which exchanges information among computers through use of related-art text-dominated electronic mails or a computer program which implements equivalent functions.

Various schemes for transmitting and receiving image data by way of the Internet have already been proposed. Image data which are several pages in length, such as those pertaining to a business document, are transmitted and received while being stored in a file, such as TIFF (Tagged Image File Format) developed by Aldus Corporation in the U.S. (now a part of Adobe Systems in the U.S.). By way of an example, specifications for an image data format handled by the Internet facsimile apparatus are defined on the basis of the TIFF standards. Specifications for an image data format to be handled by an Internet facsimile are defined by a request for comments (RFC) 2301 issued by the Internet Engineering Task Force (IETF).

Figure 9:
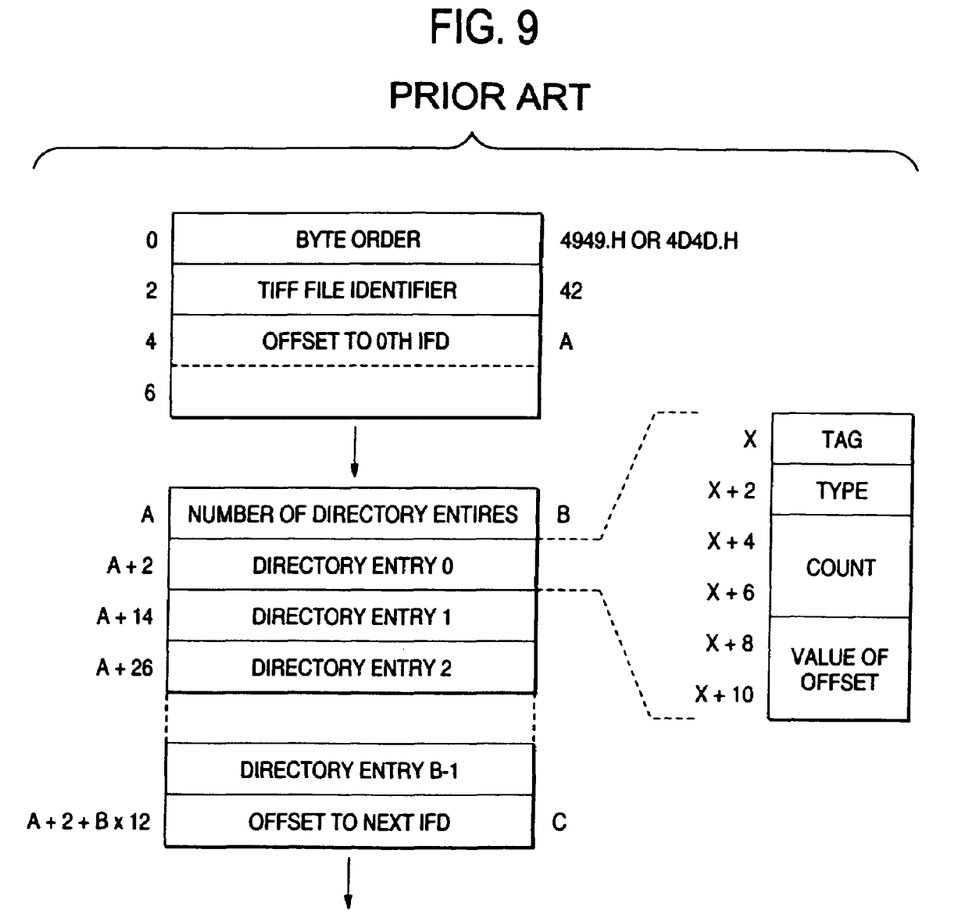
FIG. 9 is a schematic diagram showing the configuration of a file of TIFF format.

FIG. 9 is a view showing the configuration of a TIFF-format file (hereinafter called a "TIFF file"). The TIFF file has a tree structure beginning with a header (Header). The header consists of three information items; that is, a byte order (Byte Order), a TIFF file identifier (TIFF Identifier), and an offset (Offset of 0th IFD) of an image file directory (Image File Directory: IFD) which specifies attribution information concerning the resolution and size of a first image. The header is formed from a total of eight bytes. The first two bytes (i.e., Byte 0 and Byte 1) of a TIFF file are allocated to byte order. The byte order represents the manner in which a multi-byte value is preserved in a TIFF file. The byte order of two bytes corresponds to either "II (Little-endian Byte Order indicated by 4949.H; ".H" means a hexadecimal number)" or "MM (Big-endian Byte Order indicated by 4D4D.H)." Two bytes subsequent to the byte order (i.e., Byte 2 and Byte 3) are allocated to the TIFF file identifier. More specifically, "42 (indicated by a decimal number)" is described as the TIFF file identifier. The only requirement for determining whether or not an arbitrary data file is a TIFF file is to check the first four bytes. An offset to an image file directory is allocated to four bytes (Byte 4 to Byte 7) subsequent to the TIFF file identifier. The position of a first image file directory within a TIFF file is described as a byte offset value while the head of the TIFF file is taken as a reference. Here, an offset value A is stored in the TIFF file.

An image file directory is usually described subsequent to the header. The image file directory (IFD) is constituted of, in the order given, the number of directory entries (Number of Directory Entries), a plurality of directory entries (Directory Entries), and an offset of the next image file directory (Offset of Next IFD). The first two bytes (i.e., Byte A and Byte A+1) of the image file directory are allocated to the number of directory entries. The number of directory entries shows the number of subsequent directory entries. Here, B directory entries follow the header. Each of B directory entries (i.e., from directory entries, 0, 1, . . . B−1) is allocated 12 bytes. Various information items concerning corresponding image data (i.e., a size, a resolution, a color space, a compression encoding scheme, and a storage location) are described in the directory entries. An offset of the next image file directory is allocated four bytes subsequent to the final directory entry B−1. The position of the next image file directory is described as a byte value offset while the head of the TIFF file is taken as a reference. The present example shows that an offset value C is stored in the file. An offset of the next image file directory assuming a value of 0 means that the image file directory is the final image directory of the TIFF file.

In a TIFF file, corresponding actual image data are usually stored in succession to each of image file directories. In terms of TIFF specifications, the layout of an image file directory and image data is not defined definitely. Consequently, there is allowed a TIFF file constructed such that image data are stored in a file so as to precede a corresponding image file directory. For this reason, an information processing apparatus which decodes a TIFF file is desirably capable of processing an image file directory and image data regardless of their layouts.

For example, the Unexamined Japanese Patent Application Publication No. Hei11-127297 describes an information processing apparatus capable of processing an image file directory and image data regardless of their layouts. According to the technique described in the patent, encoded image data included in a TIFF file are stored in image memory. At a point in time when an image file directory corresponding to encoded image data stored in image memory is retrieved from a TIFF file, the encoded image data are read from the image memory and decoded. The thus-decoded image data are output. By means of storing image data into memory, print processing can be effected regardless of the layout of image data corresponding to the image file directory.

However, according to such a related-art technology, a received TIFF file is temporarily stored in memory. Hence, printing of the TIFF file cannot be effected until receipt of the TIFF file is completed. Hence, difficulty is encountered in shortening a time from initiation of receipt of a TIFF file to initiation of printing of the received TIFF file.

SUMMARY OF THE INVENTION

[Problem to be Solved]

The present invention has been conceived against the foregoing back drop and is aimed at providing an image information processing apparatus capable of shortening a time from initiation of receipt of a TIFF file to initiation of printing or display of the received TIFF file, of immediately outputting the received TIFF file, and of enabling high-speed output of the file, as well as providing a computer-readable recording medium which implements these features.

[Means for Solving the Problems]

An image information processing apparatus according to the present invention disposed at the sending end stores, in header information pertaining to image information, information indicating that attribute information and image data are arranged in a predetermined sequence. The processing apparatus stores attribute information and image data in a predetermined sequence, thereby producing image information and sending the thus-produced image information. An image information processing apparatus disposed at the receiving end determines whether or not attribute information and image data are stored in a predetermined sequence, from header information pertaining to received image information. When it is determined that attribute information and image data are arranged in a predetermined sequence, image data including image information is immediately decompressed. If attribute information and image data are arranged in a predetermined sequence, the image data can be decompressed without storing all the transmitted information pieces. According to the present invention, from header information pertaining to image information, a determination is made as to whether or not attribute information and image data are arranged in a predetermined sequence. Header information is inevitably present in image information, and hence a determination can be made at the head of image information. If it is confirmed that attribute information and image data are arranged in a predetermined sequence, the image information is decompressed immediately. As a result, a time from initiation of receipt of a TIFF file to initiation of decompression of the file is shortened. Consequently, a time from receipt of a file to initiation of printing or displaying of the file can also be shortened. There is no necessity of storing received image information in a low-speed hard disk drive, thereby enabling high-speed output operation.

Further, according to the present invention, negotiations regarding the layout of attribute information and image data are conducted between an image information processing apparatus at the sending end and an image information processing apparatus at the receiving end. When, as a result of negotiations, there has already been reported that attribute information and image data are arranged in a predetermined manner, image data included in the received image information are decompressed immediately. As mentioned above, if attribute information and image data are arranged in a predetermined manner, decompression of the received image data can be performed without accumulating all the transmitted image information items. Accordingly, upon receipt of image information, the image information processing apparatus can decompress image data immediately, thereby shortening a time from initiation of receipt of image information to initiation of decompression of the information. Further, a time from receipt of image information to initiation of outputting or displaying of the file can also be shortened, thereby enabling high-speed output operation.

Features of the image information processing apparatus at the receiving end and those of the image information processing apparatus at the sending end can be implemented by a computer. A program for causing a computer to perform the features is stored in a storage medium. The features can be implemented by means of causing a computer to read the storage medium.

DETAILED DESCRIPTION OF THE PREFERRED EMBODIMENTS

[Modes for Implementing the Invention]

Figure 1:
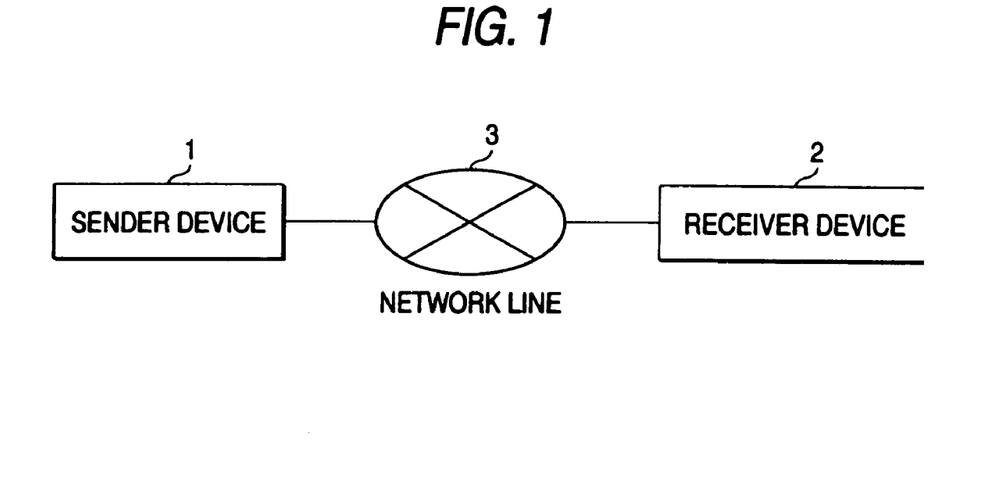
FIG. 1 is a schematic block diagram showing one example of a system to which an image information processing apparatus according to the present invention is applied.

FIG. 1 is a block diagram showing one example of a system to which an image information processing apparatus according to the present invention is applied. As shown in the drawing, reference numeral 1 designates a device disposed on a sending side (here in after referred to as a "sender device"); 2 designates a device disposed on a receiving side (hereinafter referred to as a "receiver device"); and 3 designates a network line. The sender device 1 can convert image data into a TIFF file and output the TIFF file to the outside; e.g., to the receiver device 2, by way of the network line 3. The receiver device 2 receives the TIFF file that has been transmitted from the outside; e.g., from the sender device 1, by way of the network line 3. The receiver device 2 can decompress image data contained in the TIFF file and print out or display the image data. The sender device 1 and the receiver device 2 can be constituted of a terminal device embodied in, e.g., an Internet facsimile device or a computer. Further, the sender device 1 and the receiver device 2 may include the image information processing apparatus according to the present invention.

The network line 3 is constituted of the Internet or a LAN and can transmit, e.g., electronic mails, and transfer various types of data. The network line 3 may be embodied in, e.g., a public line, a dedicated line, or a cable.

Figure 2:
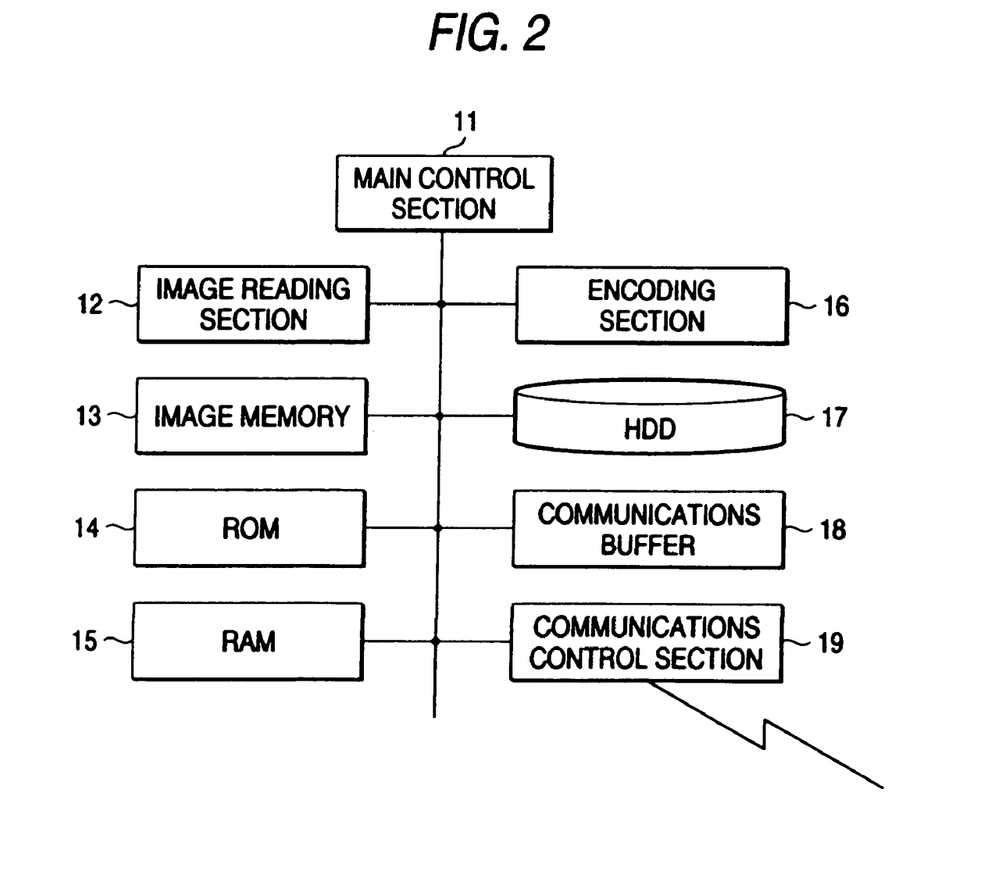
FIG. 2 is a block diagram showing one example of a sender device.

FIG. 2 is a block diagram showing one example of the sender device 1. As shown in FIG. 2, reference numeral 11 designates a main control section; 12 designates an image reading section; 13 designates image memory; 14 designates ROM; 15 designates RAM; 16 designates an encoding section; 17 designates a hard disk drive; 18 designates a communications buffer; and 19 designates a communications control section. The main control section 11 can be constituted of, e.g., an MPU, and can effect compression and encoding of image data pertaining to an original read by, e.g., an image reading section 12, generation of a TIFF file, and transmission of data to an external device by way of an unillustrated network line.

The image reading section 12 is constituted of a scanner equipped with a CCD sensor. The image reading section 12 optically reads an original placed on top of an unillustrated platen and effects photoelectric conversion of the thus-read optical data by means of a CCD sensor, thereby producing digital image data. As a matter of course, the image reading section 12 may be embodied in an ADF-mode reader which reads an original while conveying the same, or in a device using two-dimensional reading elements, such as a digital camera. The image data read by the image reading section 12 are stored in the image memory 13 in accordance with a control signal output from the main control section 1.

The image memory 13 is constituted of semiconductor memory, such as DRAM, and temporarily stores image data output from the image reading section 12 or compressed-and-encoded data output from the encoding section 16. A software program or fixed data to be used for controlling operations of the individual sections of the image information processing apparatus are stored beforehand in the ROM 14. The RAM 15 is constituted of semiconductor memory; e.g., DRAM or SRAM, and stores temporary data which would arise when the main control section 11 runs the software program. The image memory 13 and the RAM 15 may be embodied in a single storage device.

When the image data output from the image reading section 12 are monochrome binary image data, the encoding section 16 compresses and encodes the image data, by means of an encoding scheme such as an MH, MR, or MMR. When the image data output from the image reading section 12 are color multivalued image data, the encoding section 16 compresses and encodes the image data, by means of an encoding scheme such as JPEG. In this embodiment, the encoding section 16 is shown as an independent constituent element. Encoding operation can also be implemented by means of the main control section 11 running the software program stored in the ROM 14.

The hard disk drive 17 is a large-capacity storage device for storing compressed-and-encoded image data or TIFF files. When the storage capacity of the image memory 13 can be increased, the image information processing apparatus does not necessarily employ the hard disk drive 17.

The communications buffer 18 is constituted of semiconductor memory such as DRAM and temporarily stores data, such as TIFF files, which are to be transmitted to the outside by way of an unillustrated network line. The communications buffer 18, the image memory 13, and the RAM 15 may be embodied in a single memory device. As shown in FIG. 2, the communications buffer 18, the image memory 13, and the RAM 15 are provided independently, and hence reading and communication of image data can be effected simultaneously.

Under control of the main control section 11, the communications control section 19 performs predetermined communications procedures for establishing data communication with an external device connected to an unillustrated network line.

Figure 3:
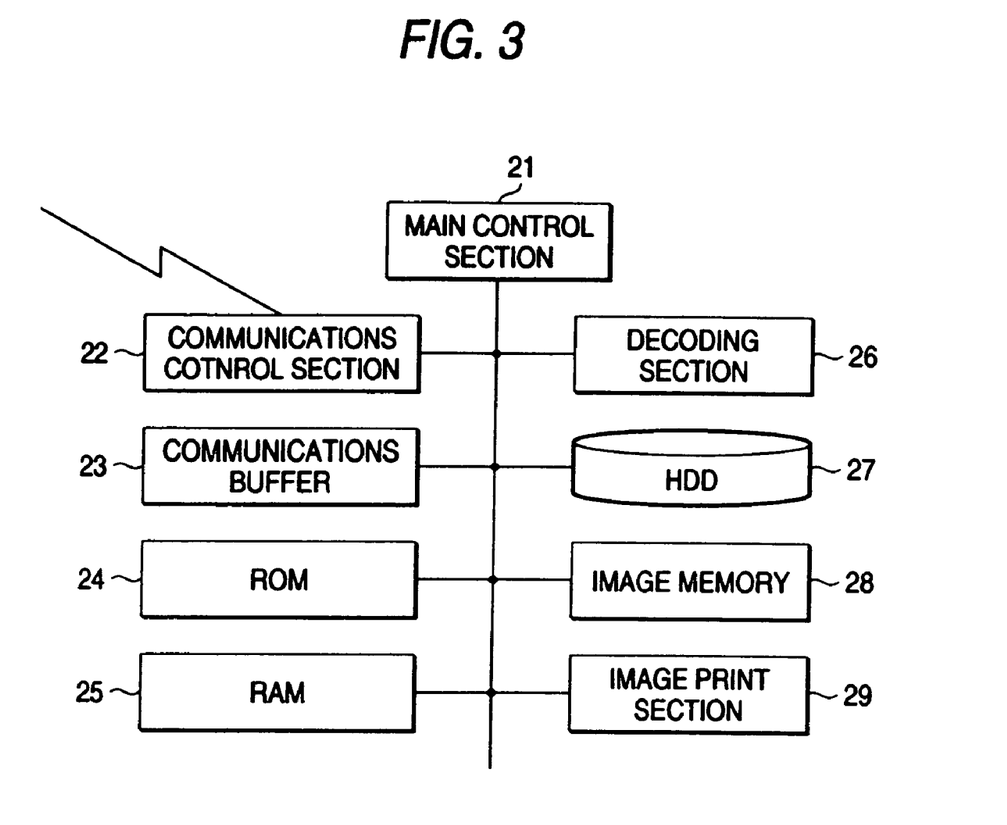
FIG. 3 is a block diagram showing one example of a receiver device.

FIG. 3 is a block diagram showing one example of the receiver device 2. As shown in the drawing, reference numeral 21 designates a main control section; 22 designates a communications control section; 23 designates a communications buffer; 24 designates ROM; 25 designates RAM; 26 designates a decoding section; 27 designates a hard disk drive; 28 designates image memory; and 29 designates an image printing section. The main control section 21 can be constituted of, e.g., an MPU. For instance, the main control section 21 controls data communication with an external device by way of an unillustrated network line, decompresses a TIFF file received from the external device in a binary form, and prints out the thus-decompressed image data by use of the image print section 29.

Under control of the main control section 21, the communication control section 22 performs predetermined communications procedures for establishing data communication with an external device connected to an unillustrated network line.

A software program for controlling operations of individual sections of the image information processing apparatus and fixed data are stored in the ROM 24 in advance. The RAM 25 is constituted of, e.g., semiconductor memory such as DRAM or SRAM. The main control section 21 stores temporary data which would arise when the software program is executed. Here, the image memory 28 and the RAM 25 may be embodied in a single storage device.

The decoding section 26 decodes and expands the encoded image data contained in the received TIFF file according to a corresponding compression scheme. In the present embodiment, the decoding section 26 is formed as an independent constituent element. A decoding operation can be performed by means of the main control section 21 running the software program stored in the ROM 24.

The hard disk drive 27 is a large-capacity storage device for storing received TIFF files. When the storage capacity of the image memory 28 can be increased, the image information processing apparatus does not necessarily have the hard disk drive 27.

The image memory 28 is constituted of semiconductor memory such as DRAM and temporarily stores decoded-and-expanded image data and image data to be printed by the image print section 29.

The image print section 29 records image data on a recording medium; e.g., recording paper, and outputs the image data. An arbitrary recording scheme can be employed; e.g., any of various known recording schemes, such as an electrophotographic scheme, an ink-jet recording scheme, a thermal transfer scheme, and a thermal scheme. As an alternative to a color recordable device, a device capable of recording only monochrome image data may be employed as the image print section 29. Further, a recording apparatus having various mechanisms, such as a double-sided recording apparatus, may be employed.

First example operations of the sender device 1 having the foregoing configuration and those of the receiver device 2 having the foregoing configuration will now be described. The following descriptions show an example in which a TIFF file is transferred in the form of an electronic mail. As a matter of course, transfer of image data is not limited to the form of an electronic mail. Various types of transfer schemes can be employed, so long as a file can be transferred by the schemes.

To being with, the operation of the sender device 1 will be described. An operator sets an original on an unillustrated platen of the image reading section 12 and depresses a key on an unillustrated control panel. Thus, the operator enters information for specifying a destination of a TIFF file; for example, an E-mail address, and attribute information such as a reading resolution of an original or a scheme of encoding image data. Subsequently, the operator depresses an unillustrated read start button. Upon detecting that the operator has operated the control panel, the main control section 11 sequentially reads the program stored and retained in the ROM 14 and stores generated temporary data into the RAM 15, as required, thus controlling the overall operation of the image information processing apparatus. These operations are iterated continuously until transmission of a TIFF file is completed.

When the operator depresses the unillustrated read start button, the image reading section 12 produces digital image data in accordance with attribute information pertaining to an operation for reading an original set by way of the unillustrated control panel. The digital image data are written into the image memory 13. After having confirmed that the image data are written into the image memory 13, the main control section 11 activates the encoding section 16, thereby compressing and encoding image data according to an encoding scheme complying with the attribute information.

The encoding section 16 captures image data to be sequentially stored into the image memory 13, through DMA transmission, and compresses and encodes the image data. The resultantly-encoded image data are written again into a free space on the image memory 13 through DMA transmission. The encoded image data to be written into the image memory 13 are stored further into the hard disk drive 17 by means of DMA transmission. The storage space on the image memory 13—where the encoded image data had been stored before being written into the hard disk drive 17—is opened as an available area.

The encoded image data stored in the hard disk drive 17 are stored while being compiled on a per-page basis, until the image reading section 12 finishes reading operation. The reason for this is as follows: First, in terms of TIFF specifications, the size of image data corresponding to each of image file directories must be described in a strip-byte-count-tag field on a per-byte basis. Second, when image data consisting of a plurality of pages are included in one TIFF file, the total number of pages and page numbers of image data corresponding to the respective pages must be described in a page-number tag field of the image file directory. However, in terms of TIFF specifications, there is no necessity of an image file direction—into which the attribute of the image data is to be described—preceding the image data.

After image data pertaining to all pages read by the image reading section 12 have been stored in the hard disk drive 17, the main control section 11 reads, from the hard disk drive 17, image data which have been encoded on a per-page basis and starts generating a TIFF file.

Figure 4:
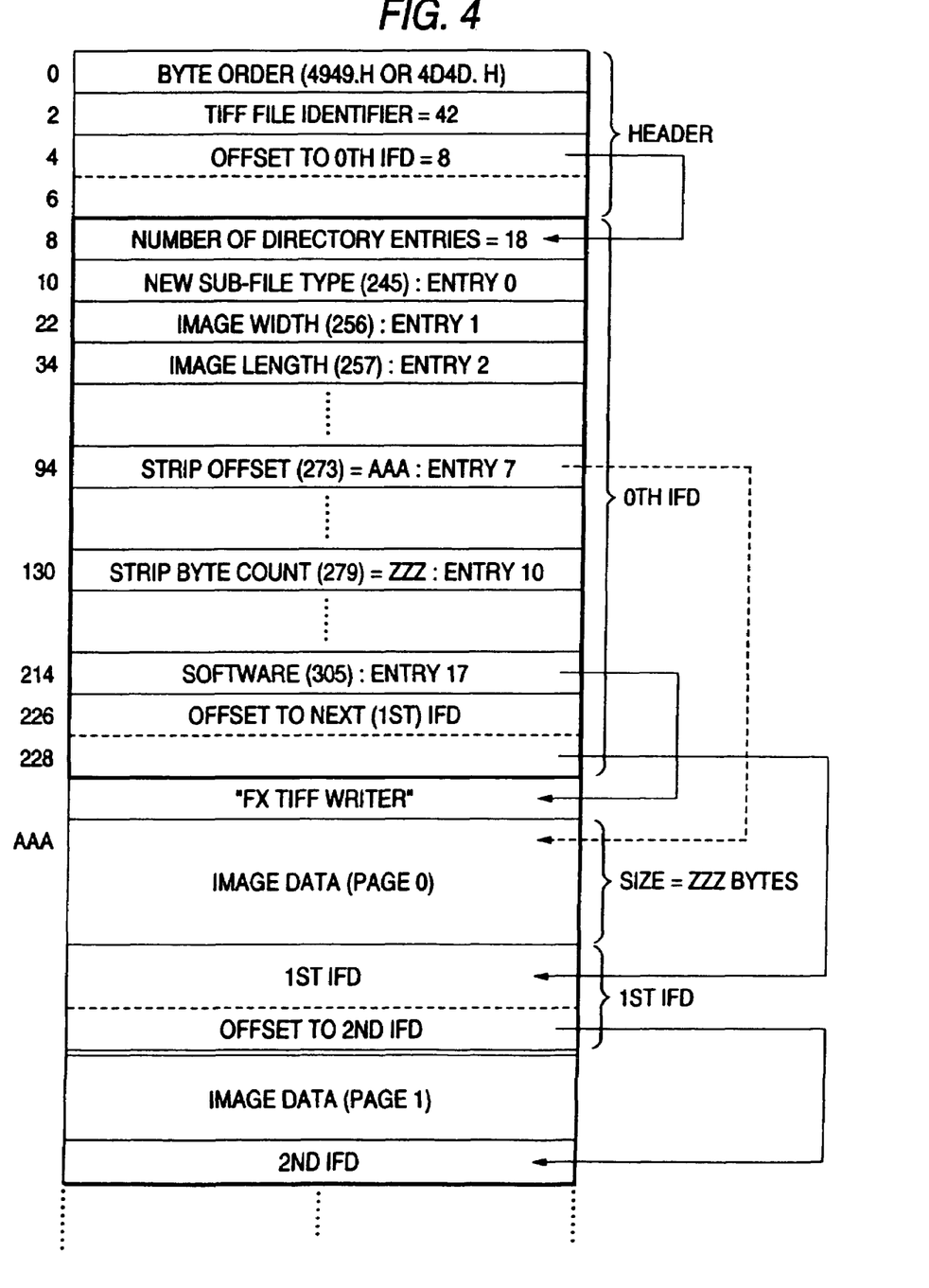
FIG. 4 is a data block diagram showing one example of a TIFF file produced as a result of first example operations of the sender device.

FIG. 4 is a data block diagram showing an example TIFF file produced in the first example operation of the sender device 1. As mentioned above, a header of leading eight bytes of the TIFF file includes a byte order, followed by an identifier "42" and an offset value. The byte order shows a sequence in which bytes of a TIFF file are to be stored, and the identifier "42" explicitly shows that the file is of TIFF format. Further, the offset value shows a location where the first image file directory is stored. As shown in FIG. 4, the offset value assumes a value of "8" in the present embodiment. This means that, in the present TIFF file, a head is followed by the first image file directory.

Information about the size of image data (Image Width and Image Length), a resolution (XResolution, and YResolution), a color space (PhotometricInterpretation), and a compression and encoding scheme (Compression) is stored in the image file directory as attribute information. A storage location of encoded image data corresponding to image data pertaining to a page of interest is indicated by an offset value (AAA shown in FIG. 4) included in the head of the TIFF file. The offset value is specified by a strip offset (StripOffsets) tag field. An offset value AAA is determined by the number of tag fields to be stored into an image file directory, and by a field value which cannot be stored into one tag field following the tag fields. The size of compressed and encoded image data is specified by a strip byte count (Strip Byte counts) tag field on a per-byte basis. In the embodiment shown in FIG. 4, encoded image data of ZZZ bytes corresponding to image data pertaining to the first page are stored consecutively at a position which is spaced from the head of the TIFF file by only an offset value of AAA. The size of encoded image data can be readily determined by comparing a leading address and an end address of the location where the image data are stored in the hard disk drive 17.

The TIFF file produced in the operation example has a configuration such as that shown in FIG. 4. Specifically, an image file directory—in which attribute information about image data is stored on a per-page basis—is followed by encoded image data pertaining to a page of interest. For the sake of convenience, a TIFF file having such a configuration is called a sequential TIFF. Specifications of a file format for an Internet facsimile, which are known as TIFF-FX, are defined by RFC (Request for Comments) 2301 issued by the IETF (Internet Engineering Task Force). According to this specification (standard), a TIFF file based on a profile S is required to be a sequential TIFF. Making a determination as to whether or not the configuration of a TIFF file corresponds to a sequential TIFF usually requires checking of the layout of image data corresponding to an image file directory contained in the TIFF file. To this end, information used for identifying whether or not the TIFF file is a sequential TIFF is stored in the image file directory. More specifically, the TIFF file is clearly demonstrated to be produced by means of software for producing a sequential TIFF and through use of an ASCII code character sequence terminating with a NULL code. The embodiment shown in FIG. 4 shows that the TIFF file is a sequential file, by means of a character sequence "FX TIFF Writer." The character sequence is appended immediately after the image file directory.

The sequential TIFF file prepared by the main control section 11 may be stored again in the hard disk drive 17 after having been temporarily stored in the image memory 13. Alternatively, the sequential TIFF file may be immediately transmitted to an external device after having been transferred to the communications buffer 18. The following description is based on the case where the sequential TIFF file is temporarily stored in the hard disk drive 17.

After having finished storing, into the hard disk drive 17, TIFF files corresponding to a set of originals read by the image reading section 12, the main control section 11 sends a control signal to the communications control section 19, in order to establish data communication with an external device while the mail address entered by way of the unillustrated control panel is taken as a destination. Further, the main control section 11 reads a TIFF file to be sent to the external device from the hard disk drive 17 and sequentially transmits and temporarily stores the thus-read TIFF file to the communications buffer 18. The communications control section 19 converts the TIFF file stored in the communications buffer 18 into, e.g., text data which can be appended to an electronic mail. Then, the communications control section 19 sends the text data to the external device by way of the unillustrated network line. Data in binary format, such as a TIFF file, are converted into text data in compliance with an encoding type of MIME (Multipurpose Internet Mail Extensions) specified by RFC1521.

Figure 5:
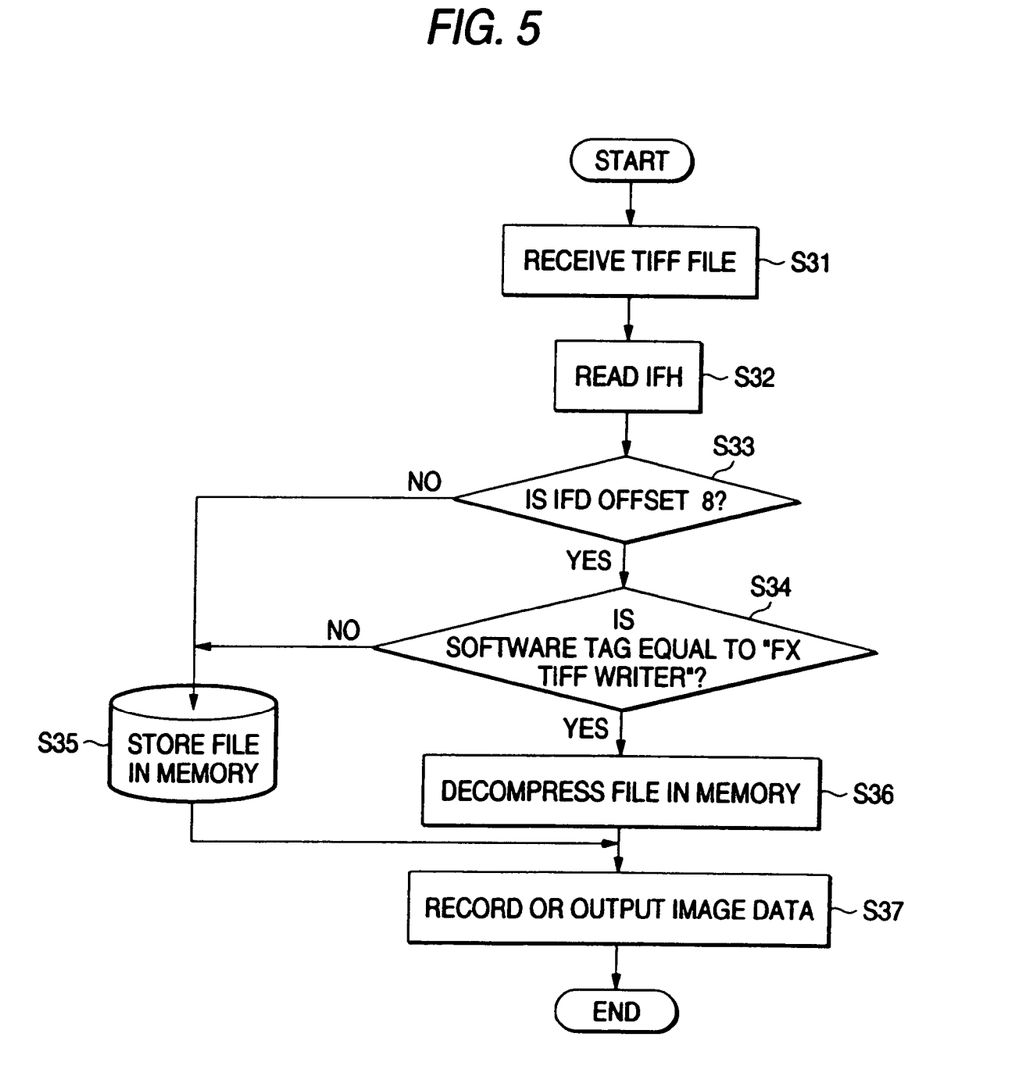
FIG. 5 is a flowchart showing first example operations of the receiver device.

A first example of operation of the receiver device 2 which receives a TIFF file transmitted from the sender device 1 in the manner as mentioned above will now be described. FIG. 5 is a flowchart showing the first example of operation of the receiver device 2. When connection between the image data processing apparatus and the external apparatus via an unillustrated network line has been established, the main control section 21 starts receiving a TIFF file in step S31. When a TIFF file has arrived at the communications control section 22 in the form of an electronic mail, the main control section 22 issues an instruction to the communications control section 22, in order to convert the TIFF file from an electronic mail format into a binary format. Upon receipt of the instruction, the communications control section 22 converts a received TIFF file from an electronic mail format into a binary format while sequentially and temporarily storing the thus-converted TIFF file into the communications buffer 23.

In step S32, the main control section 21 fetches an image file header IFH, which is the head of a TIFF file stored in the communications buffer 23. In step S33, the main control section 21 makes a first determination as to whether or not the TIFF file is a sequential TIFF. A first determination is rendered as to whether or not the TIFF file is a sequential TIFF, on the basis of the result of a determination as to whether or not the first image file directory stored in the header IFH assumes an offset value of "8" indicating that the first image file directory follows the header IFH. If the offset value is not "8," the main control section 21 immediately determines that the received TIFF file is not a sequential TIFF. Subsequently, in step S35, the TIFF file is stored in the hard disk drive 27.

In contrast, when the off set value is "8," the main control section 21 tentatively determines that the received TIFF file is a sequential TIFF. In step S34, the main control section 21 performs a second determination operation. Through the second determination operation, a determination is made as to whether or not the first image file directory includes a software tag field. If the software tag field is included in the first image file directory, another determination is made as to whether or not an ASCII code specified by the software tag field matches a predetermined character sequence; namely, the previously-described value "FX TIFF Writer." If no software tag field is included or if the character string specified by the software tag field does not match the value "FX TIFF Writer," a determination is made that the TIFF file is not a sequential TIFF. Subsequently, in step S35, the TIFF file is stored in the hard disk drive 27.

If the character string specified by the software tag field matches "FX TIFF Writer," the TIFF file is stored immediately after a sequential TIFF; namely, an image file directory corresponding to compressed-and-encoded image data of each page included in the TIFF file. At a point in time when attribute information about encoded image data pertaining to the page stored in the image file directory has been acquired, in step S36 encoded image data are sent to the decoding section 26. The encoded image data are decoded and expanded to original image data, and the original image data are stored in the image memory 28.

An operation for decoding and expanding the encoded image data stored in a TIFF file, which file is not a sequential TIFF, cannot be specified without examining, over the entire TIFF file, image data corresponding to individual pages and the layout of an image file directory in which corresponding attribute information is stored. Consequently, decoding and expanding operations are performed after receipt of the TIFF file and storage of the file into the hard disk drive 27. The main control section 21 first reads a header of the TIFF file stored in the hard disk drive 27, thereby checking the location where the first image file direction is stored. Subsequently, the main control section 21 reads the first image file directory from the hard disk drive 27, thereby checking the location where corresponding encoded image data are stored and the location where the second image file directory is stored. The main control section 21 iterates the foregoing operations in the same manner, thereby checking image file directories corresponding to all pages included in the TIFF file and the locations where corresponding encoded image data are stored. In accordance with storage position information about the image file directories of the respective pages and about corresponding encoded image data, which information has been obtained as a result of examination of configuration of the TIFF file, in step S36 the main control section 21 reads desired data from the hard disk drive 27. Encoded image data are sent to the decoding section 26, where the data are decoded and expanded to original image data. The original data are then stored in the image memory 28.

After the image data have been stored in the image memory 28, in step S37 the image print section 29 reads the image data from the image memory 29, thereby recording an image on recording paper. Printing operation being performed by the image print section 29 is usually difficult to suspend. For this reason, the image print section 29 outputs image data after image data to be printed have been stored in the image memory 28. These operations are performed consistently, regardless of whether or not the TIFF file is a sequential TIFF.

As is obvious from the foregoing descriptions, a sequential TIFF file is output without involvement of a TIFF file being stored in the hard disk drive 27. Hence, a time from initiation of receipt of a TIFF file to initiation of recording of the file is shortened, thereby enabling immediate output of a received image. Further, a TIFF file can be output without being temporarily stored in a hard disk drive involving a long access time. Hence, high-speed output of a TIFF file can be implemented.

In the above embodiment, in order to indicate that a TIFF file is a sequential TIFF file, a character string "FX TIFF Writer" is specified by means of a software tag field. As a matter of course, an arbitrary character string can be employed; the only requirement is to use a unified character string for both the sender device 1 and the receiver device 2. Further, a tag field to be employed is not limited to a software tag field; another tag field may be employed, so long as use of the tag field for both a sender device and a receiver device has been determined in advance.

Second example operations of the sender device 1 and those of the receiver device 2 will next be described. In the second example, before transmission of a TIFF file, information about the status of the sender device 1, the status of the receiver device 2, and the capability of processing image data, such as a TIFF file, is exchanged between the sender device 1 and the receiver device 2 in accordance with a predetermined capability exchange protocol. Below are shown an example of reporting of the capability of the sender device 1 and that of the receiver device 2 pertaining to a sequential TIFF, and an example of reporting whether a sequential TIFF file is sent. Exchange of capability between the sender device and the receiver device can be implemented by means of a software program. Hence, the configuration of the image data processing apparatus shown in FIGS. 2 and 3 can be employed in its present form.

Figure 6:
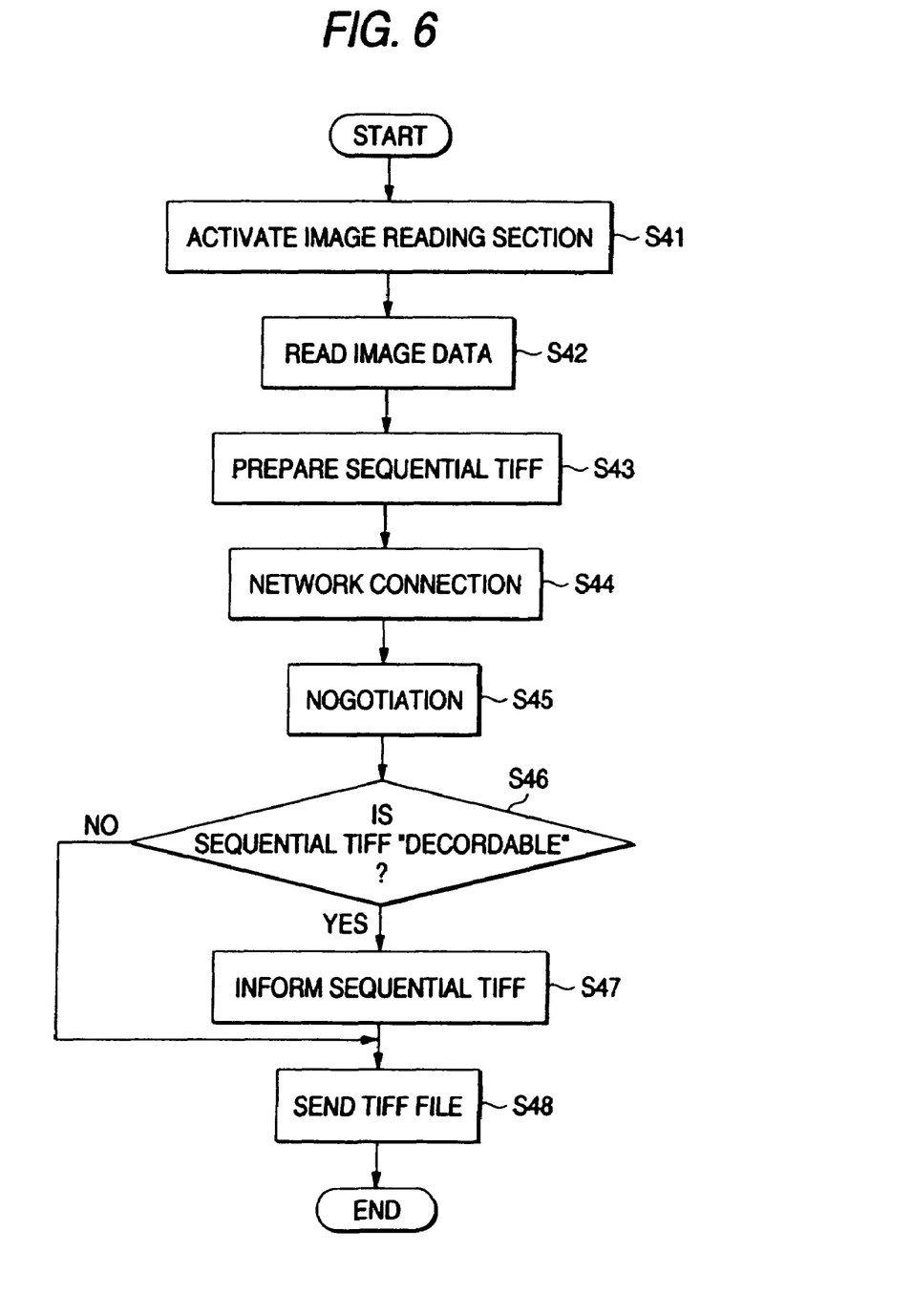
FIG. 6 is a flowchart showing second example operations of the sender device.

FIG. 6 is a flowchart showing the second example operations of the sender device 1. When having detected that the operator has operated an unillustrated control panel, the main control section 11 is activated. The main control section 11 then fetches network address information—which is entered by means of the operator pressing keys on the control panel and which specifies the destination of a TIFF file—and attribute information about a reading resolution of an original and about a scheme for encoding image data. Further, in step S41, the main control section 11 detects depression of an unillustrated read start button, thereby activating and controlling the image read section 12. In step S42, the image reading section 12 writes the thus-read digital image data into the image memory 13, in accordance with attribute information pertaining to an operation for reading an original set by way of the unillustrated control panel. The image data that have once been written into the image memory 13 are compressed and encoded by the encoding section 16 through use of an encoding scheme which has been specified by way of the control panel or has been determined beforehand.

In step S43, the main control section 11 converts the image data compressed and encoded on a per-page basis into a sequential TIFF file. In a sequential TIFF file, the first image file directory is stored so as to follow a header (IFH) of leading 8 bytes of the TIFF file. Encoded image data pertaining to a page corresponding to the attribute information stored in the image file directory are stored so as to follow the image file directory. These operations are iterated over all the pages read by the image reading section 12, thereby preparing one sequential TIFF file. The thus-prepared sequential TIFF file is stored in the hard disk drive 17.

In step S44, the main control section 11 sends a control signal to the communications control section 19 so as to establish connection with the external device specified by the network address entered by way of the control panel. After network connection has been established with the external device, in step S45 the main control section 11 conducts negotiations with the external device by way of the communications control section 19. Through a negotiation operation, negotiations pertaining to the capability of processing a TIFF file are conducted. In step S46, the main control section 11 makes an inquiry as to whether or not the external device can process a sequential TIFF file. If an answer indicating that processing of a sequential file is possible is sent back from the external device, in step S47 the main control section 11 sends, to the external device, a message indicating that a sequential TIFF file is sent, and hence processing proceeds to step S48. If in step S46 no answer is sent back from the external device or an answer stating that processing of a sequential TIFF file is not possible is sent back from the external device, processing immediately proceeds to step S48.

In the second operation example, the sender device 1 notifies the receiver device 2 that the TIFF file is a sequential TIFF file, before the receiver device 2 receives the TIFF file. For this reason, the sequential TIFF file prepared through the foregoing operation example is not required to explicitly declare, through use of the software tag field shown in FIG. 4, that the TIFF file is prepared by software for producing a sequential TIFF file. As will be described later, the receiver device is also not required to detect, from a header or a image file directory, identification information indicating that a TIFF file is a sequential TIFF file, as has been described in connection with the first operation example.

After having closed negotiations, in step S48 the TIFF file is transmitted. In this step, the main control section 11 reads from the hard disk drive 17 the TIFF file to be sent to the external device, and temporarily stores the thus-read TIFF file into the communications buffer 18. Simultaneously, the main control section 11 sends a control signal to the communications control section 19, in order to send the TIFF file stored in the communications buffer 18 to the external device by way of an unillustrated network line. In accordance with the control signal, the communications control section 19 sends the TIFF file to the external device.

Figure 7:
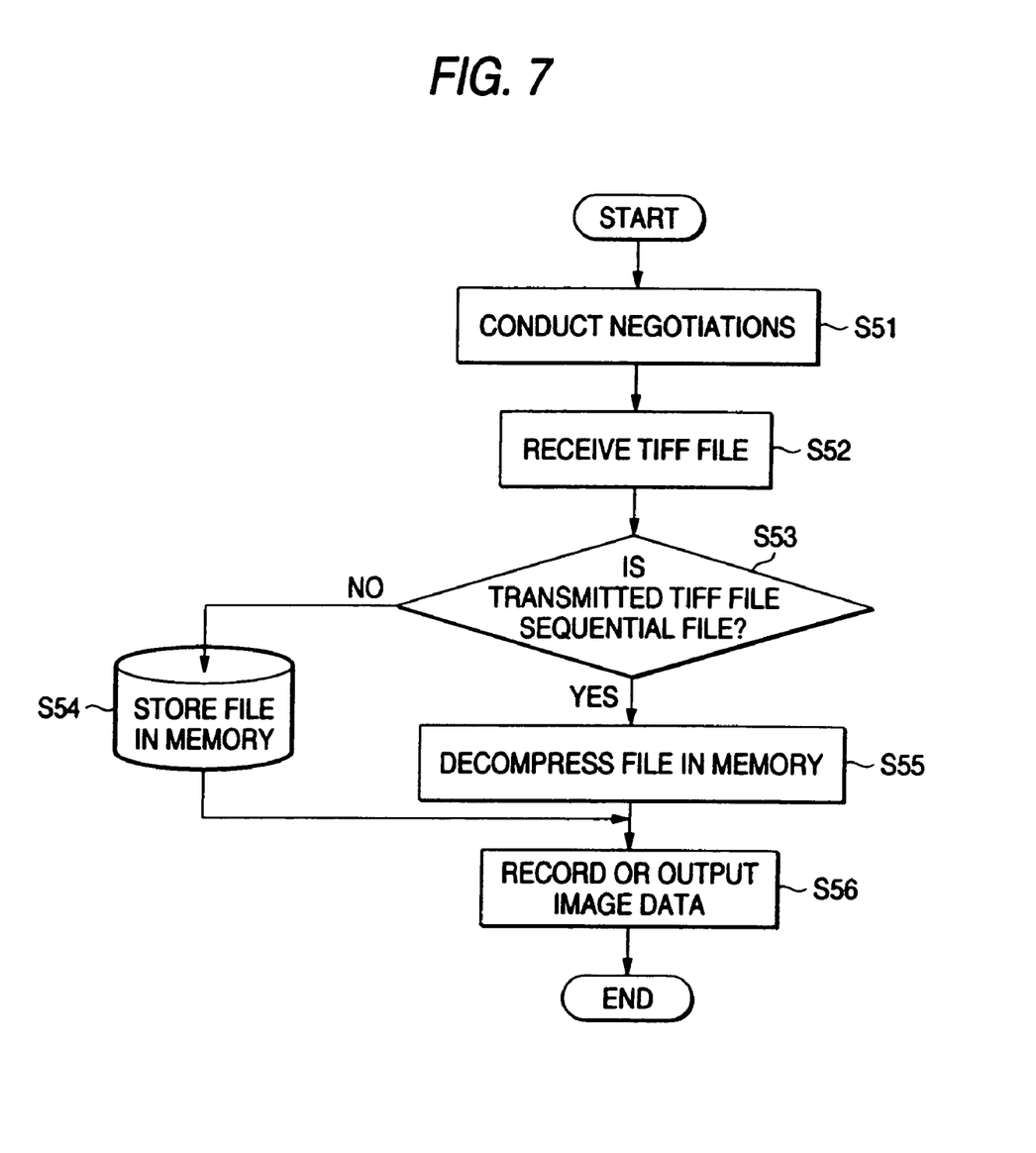
FIG. 7 is a flowchart showing second example operations of the receiver device.

FIG. 7 is a flow chart showing the second example operations of the receiver device 2. After network connection has been established with the external device by way of an unillustrated network line, in step S51 the main control section 21 conducts negotiations with the external device by way of the communications control section 22, with regard to the capability of processing a TIFF file. Particularly, there is exchanged information about whether or not the structure of a TIFF file sent from the sender device to the external device corresponds to a sequential TIFF file. After completion of negotiations, the main control section 21 issues an instruction to the communications control section 22, thereby causing the same to receive a TIFF file in step S52. The received TIFF file is sequentially and temporarily stored in the communications buffer 23.

In step S53, the result of negotiation is determined. If a report indicating that the received TIFF file is a sequential TIFF file has already been received, in step S55 decompression of image data is commenced immediately. More specifically, the main control section 21 extracts from the TIFF file stored in the communications buffer 23 an image file header (IFH) serving as a head portion and the first image file directly following the IFH, thereby acquiring attribute information about image data pertaining to the first page. Further, encoded image data following the image file directory are sent to the decoding section 26, where the image data are decoded and decompressed into original image data. The thus-decompressed data are stored in the image memory 28. In step S56, the image data are output by the image print section 29.

If, as a result of negotiation, the received TIFF file turns out not to be a sequential TIFF file, in step S54 the TIFF file is stored in the hard disk drive 27. After completion of a receiving operation, in step S55 the received image data are decompressed. More specifically, in order to decode and decompress into original image data the encoded image data included in the TIFF file, image data corresponding to respective images and locations of image file directories—in which corresponding attribute information is stored—are checked. In accordance with the image file directories of respective pages and with information about the locations where the encoded image data are stored, which have been obtained through examination of configuration of the TIFF file, the main control section 21 reads desired data from the hard disk drive 27 and sends encoded image data to the decoding section 26. The image data are decoded and decompressed to original image data, and the thus-decompressed data are stored in the image memory 28. In step S56, the image print section 29 outputs image data.

As mentioned above, the receiver device 2 can receive, record, and output a sequential TIFF file without checking a header or image file directory of the TIFF file, by means of receiving beforehand, through negotiations, a message indicating that the sender device 1 is to send a sequential TIFF file. For this reason, a time from initiation of receipt of a TIFF file to initiation of recording of the file is shortened further, thereby enabling immediate output of a received image. Further, a TIFF file can be output without being temporarily stored in a hard disk drive involving a long access time. Hence, high-speed output of a TIFF file can be implemented.

Figure 8:
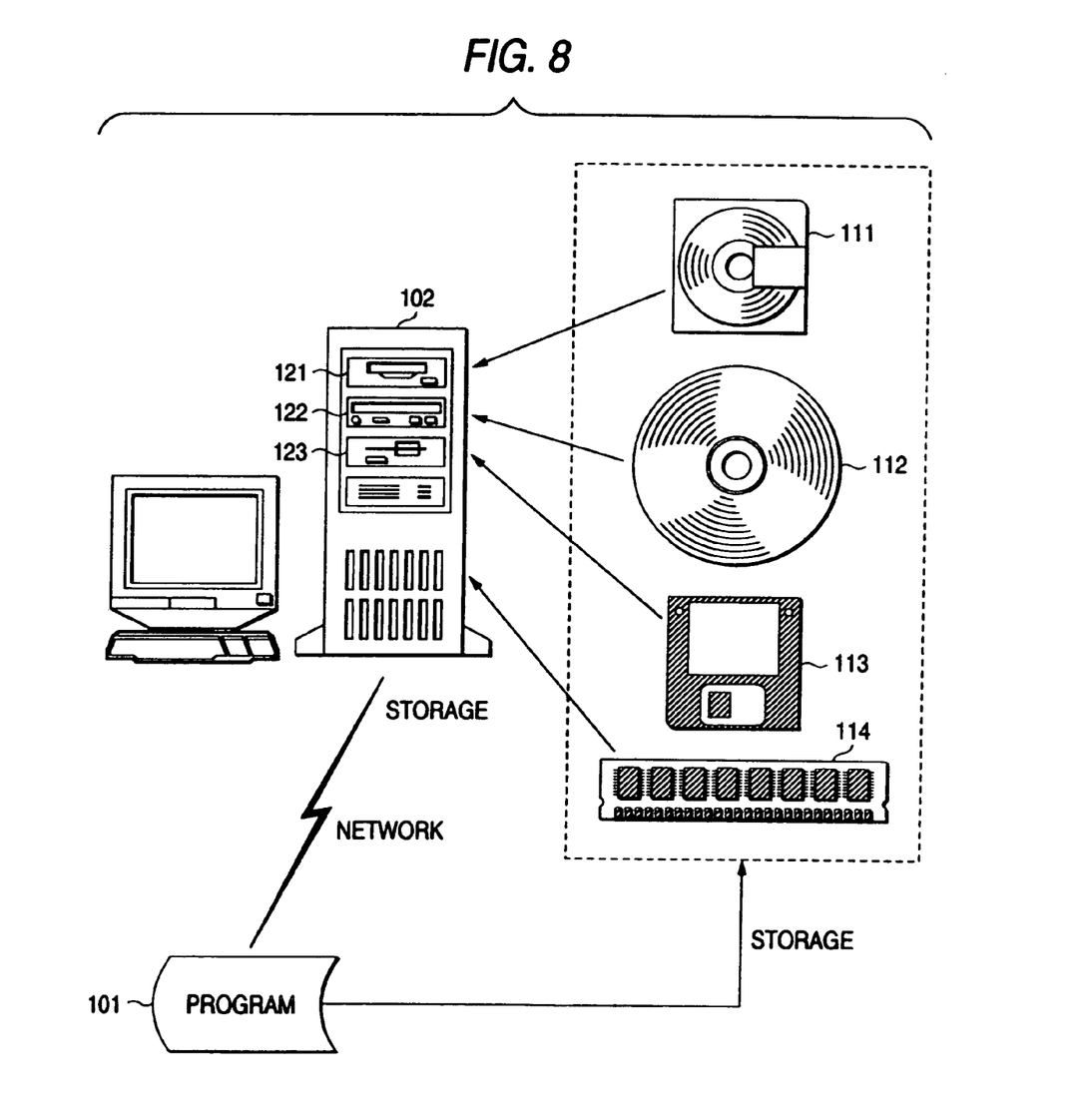
FIG. 8 is a descriptive view showing one example of a storage medium having stored therein a computer program when features of the image information processing apparatus according to the present invention are embodied in a computer program.

FIG. 8 is a descriptive view showing an example of storage medium having stored there in a computer program when the features of the image data processing apparatus according to the present invention are embodied in a computer program. As shown in the drawing, reference numeral 101 designates a program; 102 designates a computer; 111 designates a magneto-optical disk; 112 designates an optical disk; 113 designates a magnetic disk; 114 designates memory; 121 designates a magneto-optical disk drive; 122 designates an optical disk drive; and 123 designates a magnetic disk drive.

Features of the image data processing apparatus according to the present invention, which have been described in the form of the foregoing sender device 1 and the receiver device 2, may also be implemented in the program 101, which can be run by a computer. In this case, the program 101 and data employed by the program may be stored in a computer-readable storage medium. Here, the term "storage medium" signifies a medium which induces changes in energy, such as magnetism, light, or electricity, in a reading device provided in hardware resources of a computer in accordance with program descriptions, thereby enabling transmission of the program descriptions to the reading device in a corresponding signal format. For instance, the storage medium corresponds to the magneto-optical disk 111, the optical disk 112, the magnetic disk 113, or the memory 114. As a matter of course, the storage medium is not limited to a storage medium of transportable type.

The program 101 has been stored in such a storage medium beforehand. The storage medium is loaded into the magneto-optical disk drive 121, the optical disk drive 122, the magnetic disk drive 123, or an unillustrated memory slot, and the computer 102 reads the program 101. Thereby, features of the sender device 1, those of the receiver device 2, or features of both the sender device 1 and the receiver device 2 can be implemented. Alternatively, the storage medium is loaded into the computer 102 before hand. The program 101 is transferred to the computer 102 byway of, e.g., a network, thereby storing the program 101 into a storage medium and running the program 101.

[Advantages of the Invention]

As is obvious from the foregoing descriptions, according to the present invention, a determination is made as to whether or not attribute information and image data are stored in a predetermined sequence, from header information about image information. If the attribute information and image data are stored in a predetermined sequence, decompression operation is performed immediately, and the decompressed data are output. Hence, a time from initiation of receipt of image data to initiation of output of the image data can be shortened. Further, an image file can be output without being temporarily stored in a hard disk drive involving a long access time. Hence, high-speed output of a TIFF file can be implemented. Moreover, there is yielded an advantage of the ability to reduce the capacity of image memory to a capacity required for processing image data for one page and an image file directory.

Further, before transfer of a TIFF file a determination can be made, through negotiations, as to whether or not attribute information and image data are stored in a predetermined sequence, from the header information about image information. Hence, a process for checking header information about a received TIFF file can be omitted. Therefore, a time from receipt of a TIFF file to initiation of output of the file can be shortened further, thereby yielding an advantage of the ability to enable high-speed output of a TIFF file.

What is claimed is:

1. An image information processing apparatus adapted to receive image information having image data and attribute information pertaining to the image data in a image file format, wherein the image file format enables storage of the image data and the attribute information at arbitrary positions in the image file, comprising:

a communication unit that receives the image information; and a controller that determines whether a plurality of image data and a plurality of attribute information included in the image information are arranged in a predetermined sequence based on whether an offset value of an image file directory included in a header information of the image information is a predetermined value and whether a character sequence specified by a software tag filed included in the image file directory matches a predetermined character sequence, and decompresses the image data when the image data and the attribute information are determined to be arranged in the predetermined sequence.

2. An image information processing apparatus adapted to generate image information having image data and attribute information pertaining to the image data in a image file format, wherein the image file format enables storage of the image data and the attribute information at arbitrary positions in the image file, comprising:

a controller that generates the image information, wherein a plurality of image data and a plurality of attribute information are arranged in a predetermined sequence in the image file and further includes, a first information in a header information and a second information in a first image file directory of the image information, the first and second information identifies the image file format of the image information as being in the predetermined sequence, wherein the first information being an offset value of the image file directory and the second information being a character sequence specified by a software tag filed; and an output unit that outputs the generated image information.

3. The image information processing apparatus according to claim 2, wherein said output unit exchanges negotiation information in connection with a layout sequence of the attribute information and the image data with a receiver device which receives the image information, and said controller generates a information specifying the image file format of the image information on the basis of a result of the exchanged negotiation information.

4. A computer-readable storage medium that stores a program for causing a computer to perform processes for entering and decompressing image information, the processes comprising:

receiving the image information having image data and attribute information pertaining to the image data in an image file format, wherein the image file enables storage of the image data and the attribute information at arbitrary positions in the image file;

identifying, whether a plurality of image data and a plurality of attribute information included in the image information are arranged in a predetermined sequence based on whether an offset value of an image file directory included in a header information of the image information is a predetermined value and whether a character sequence specified by a software tag filed included in the image file directory matches a predetermined character sequence; and decompressing the image data when the image data and the attribute information are determined to be arranged in the predetermined sequence.

5. A computer-readable storage medium that stores a program for causing a computer to perform processes for producing image information, the processes comprising:

generating the image information having image data and attribute information pertaining to the image data in an image file format, wherein the image file enables storage of the image data and the attribute information at arbitrary positions in the image file;

storing a first information in a header information and a second information in a first image file directory of the image information, the first and second information indicates that a plurality of attribute information and a plurality of image data included in the image information are arranged in a predetermined sequence, wherein the first information being an offset value of the image file directory and the second information being a character sequence specified by a software tag filed; and outputting the produced image information.

* * * * *